J. L. WIGGINS.
APPARATUS FOR MAKING AND LAYING CONTINUOUS CONCRETE PIPE.
APPLICATION FILED DEC. 17, 1908.
952,488.
Patented Mar. 22, 1910.
6 SHEETS—SHEET 1.
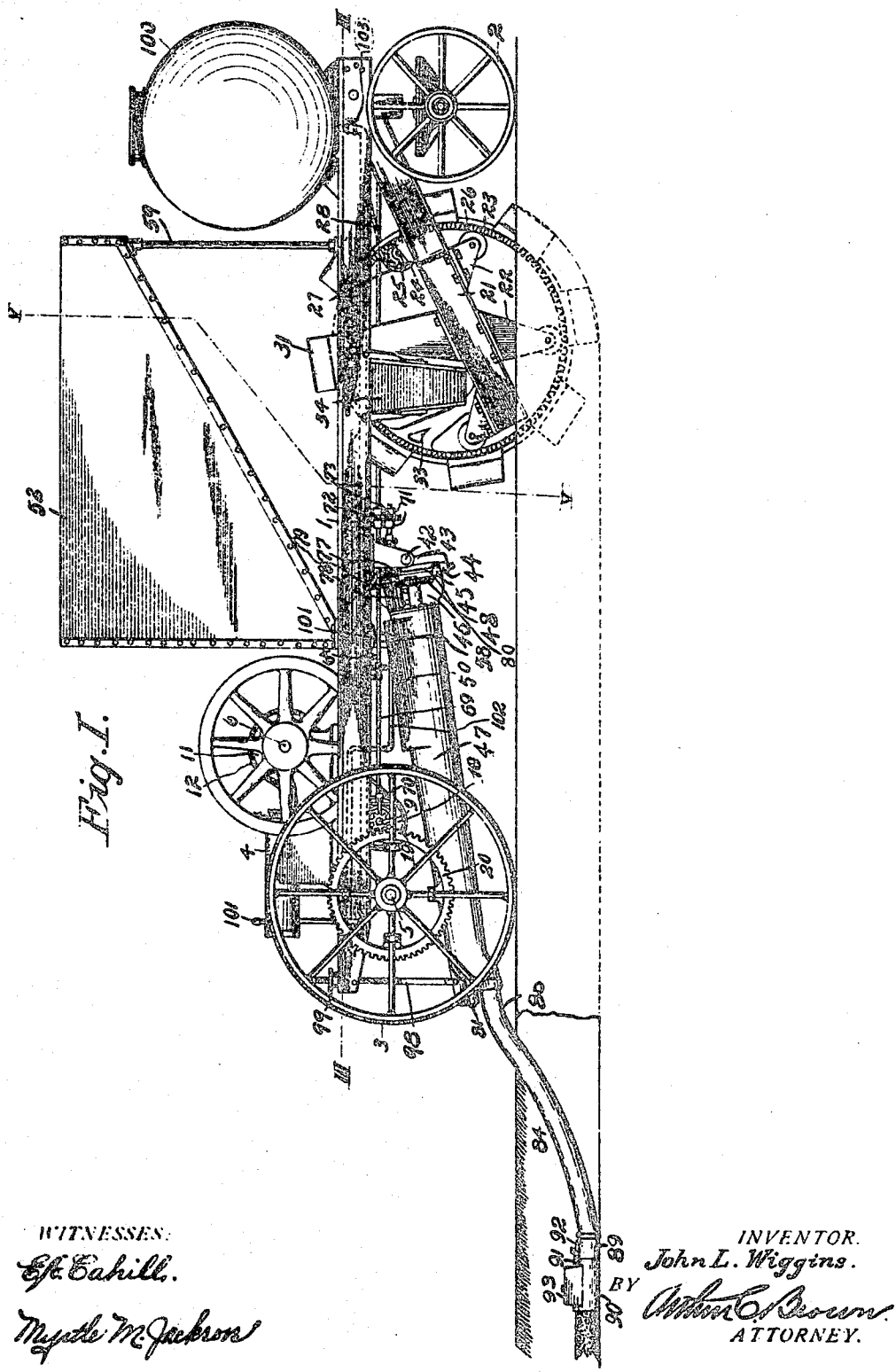
WITNESSES:
E. F. Cahill.
Myrtle M. Jackson
INVENTOR.
John L. Wiggins.
BY
Arthur C. Brown
ATTORNEY.

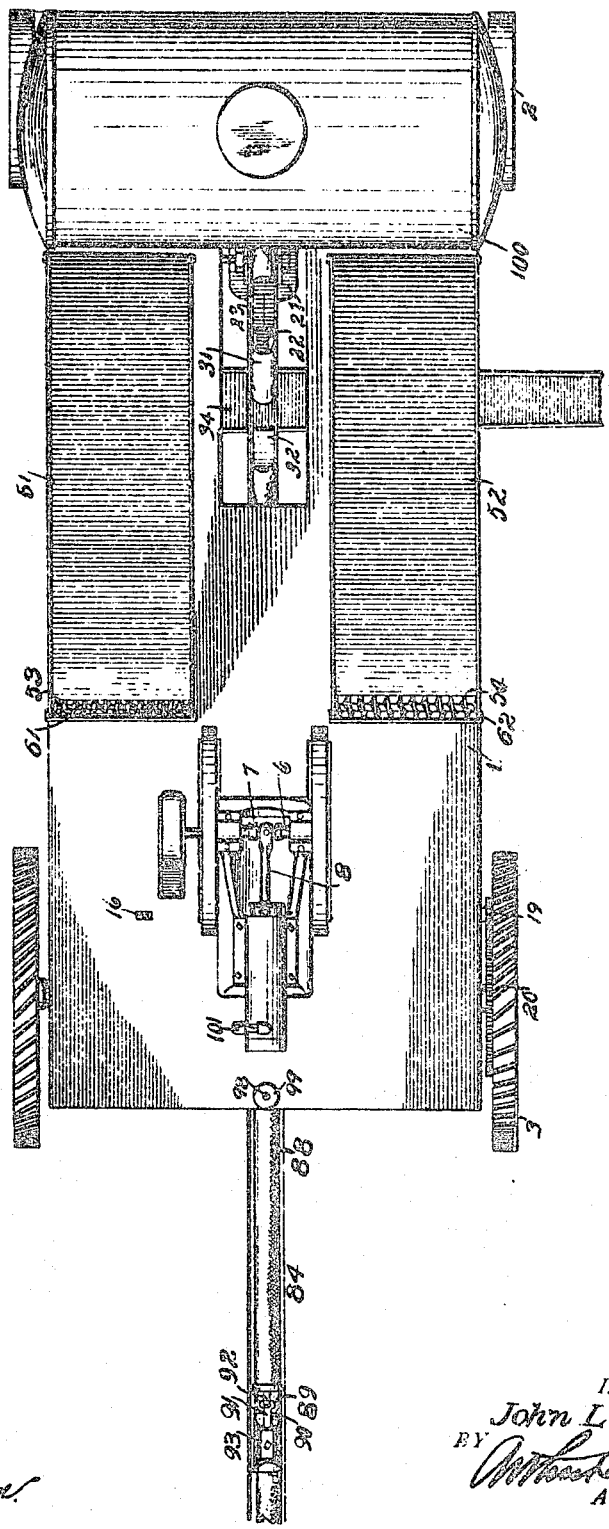

J. L. WIGGINS.
APPARATUS FOR MAKING AND LAYING CONTINUOUS CONCRETE PIPE.
APPLICATION FILED DEC. 17, 1908.
952,488.
Patented Mar. 22, 1910.
6 SHEETS—SHEET 3.
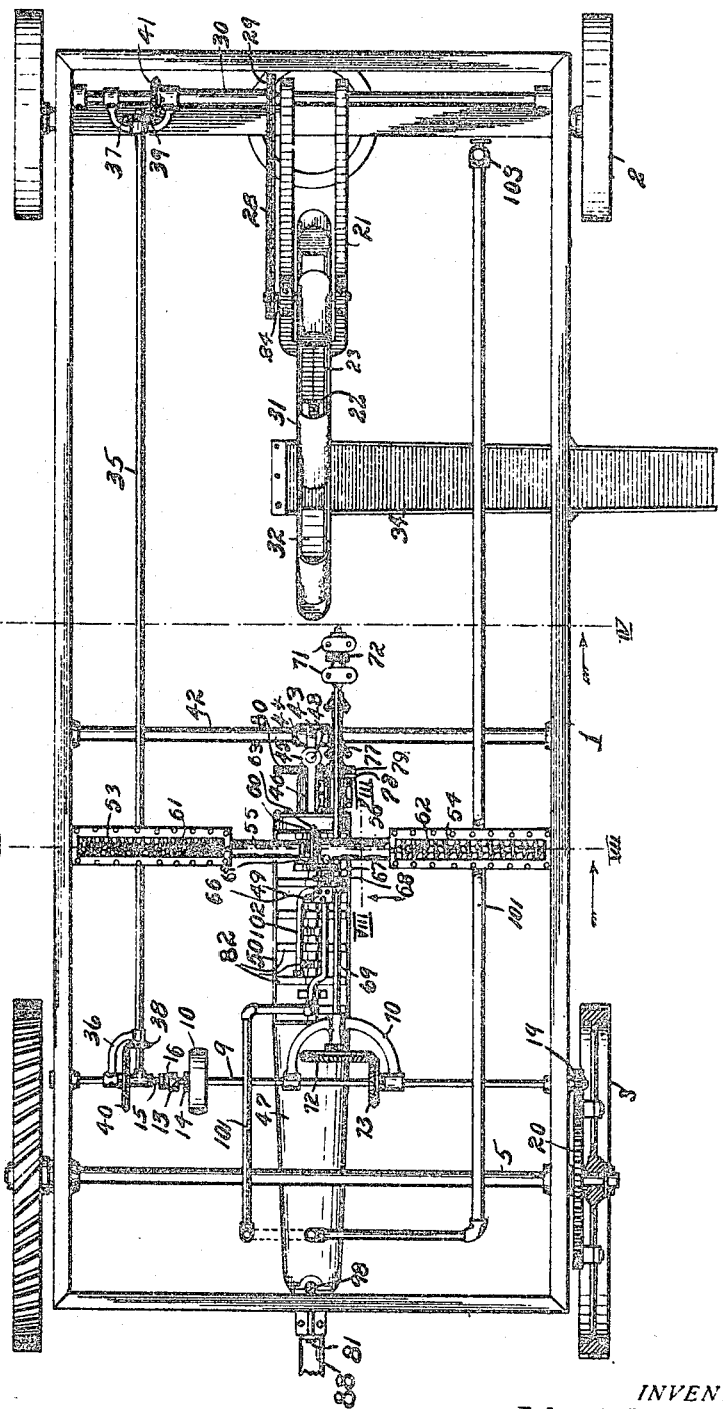
WITNESSES:
E. A. Cahill.
Myrtle M. Jackson
INVENTOR.
John L. Wiggins.
BY
ATTORNEY.

J. L. WIGGINS.
APPARATUS FOR MAKING AND LAYING CONTINUOUS CONCRETE PIPE.
APPLICATION FILED DEC. 17, 1908.
952,488.
Patented Mar. 22, 1910.
6 SHEETS—SHEET 4.
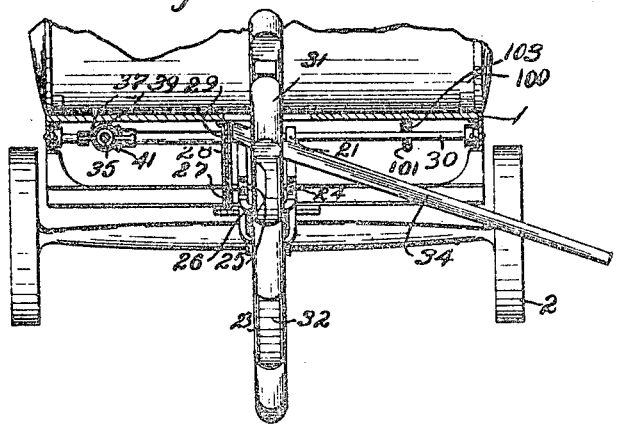
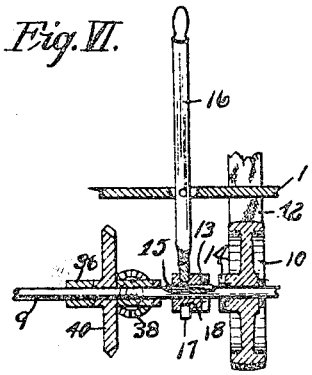
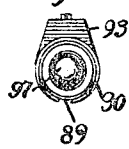
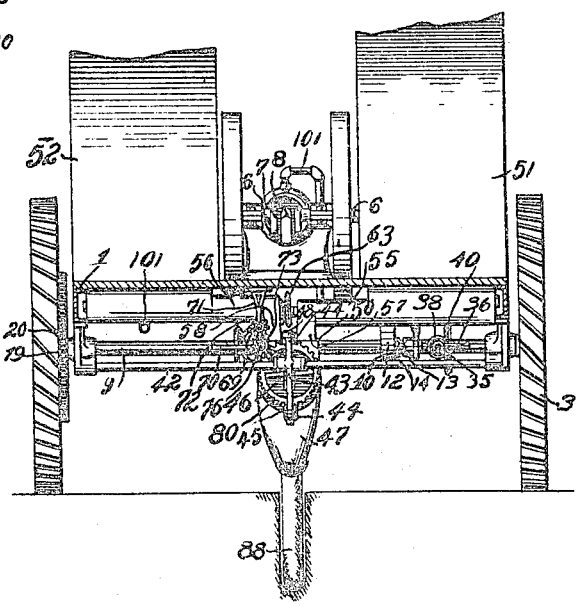
WITNESSES:
INVENTOR.
John L. Wiggins.
BY
ATTORNEY.

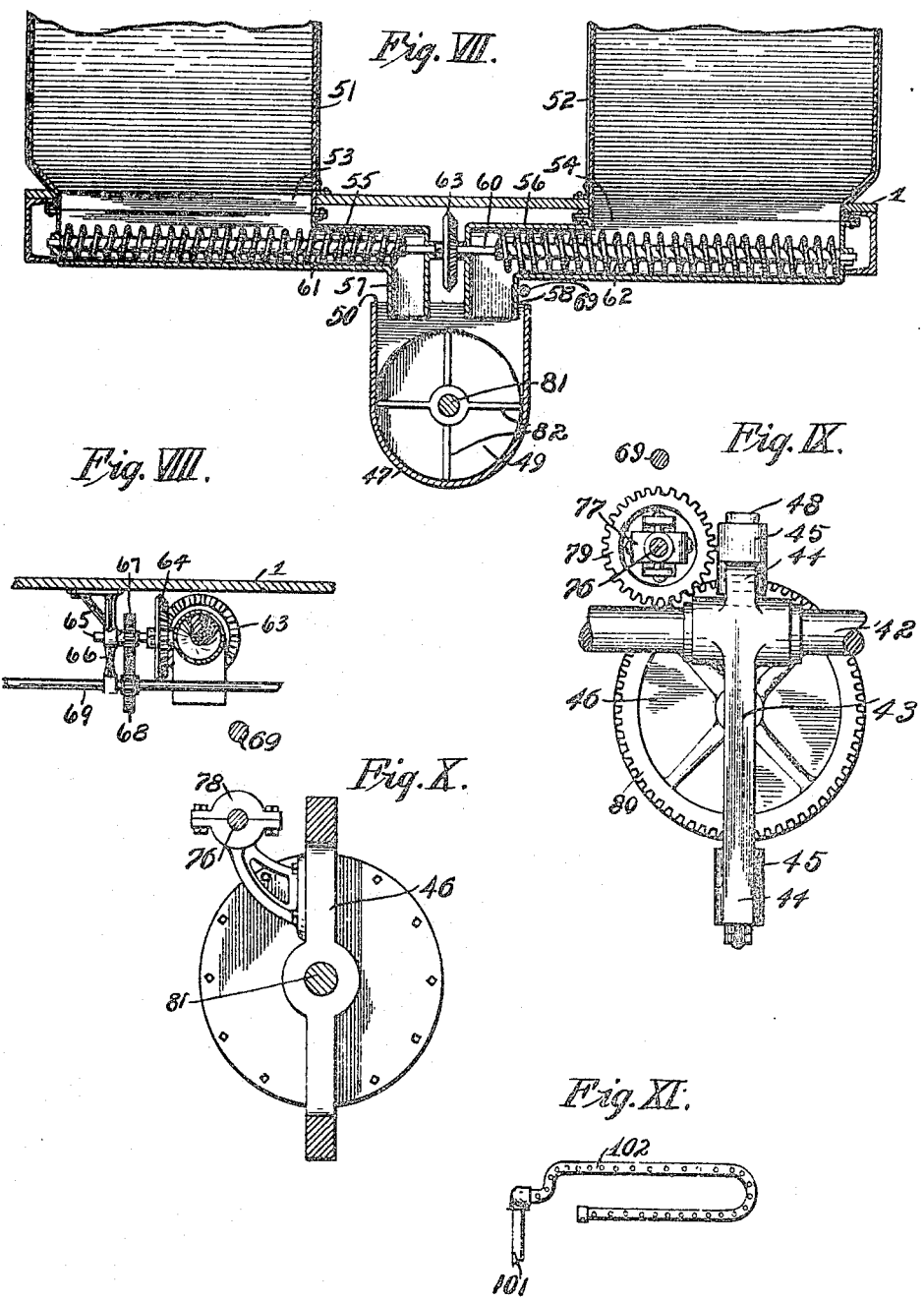

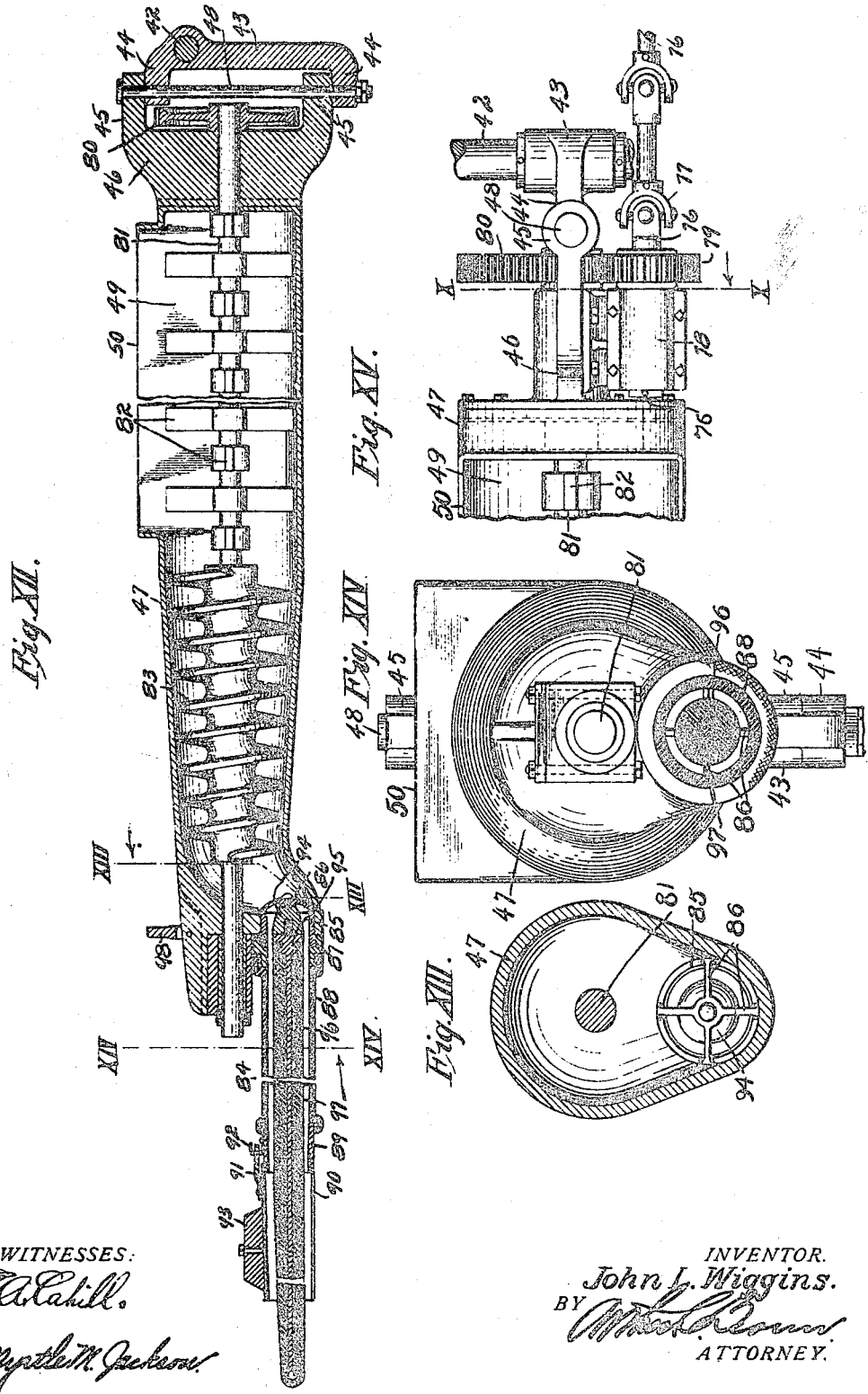

UNITED STATES PATENT OFFICE.

JOHN L. WIGGINS, OF DALLAS, TEXAS, ASSIGNOR TO THE NATIONAL LAND AND SUB-IRRIGATION COMPANY, A CORPORATION OF ARIZONA TERRITORY.

APPARATUS FOR MAKING AND LAYING CONTINUOUS CONCRETE PIPE.

952,488.

Specification of Letters Patent. Patented Mar. 22, 1910.

Application filed December 17, 1908. Serial No. 467,992.

*To all whom it may concern:*

Be it known that I, JOHN L. WIGGINS, a citizen of the United States, residing at Dallas, in the county of Dallas and State of Texas, have invented certain new and useful Improvements in Apparatus for Making and Laying Continuous Concrete Pipe, and do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a pipe making and laying apparatus, and more particularly to an apparatus for mixing, forming and laying a continuous concrete pipe for irrigation purposes.

It is the object of my invention to provide an apparatus comprising a motor driven vehicle, which is adapted for carrying a supply of concrete material, a mixer, and means for feeding material to the mixer in desired quantities, means for forming a continuous concrete pipe and for laying same in a trench, and means, carried by the vehicle and operated by the vehicle motive parts, for forming a trench in advance of the mixing and pipe laying parts. In accomplishing this object, I have provided the improved details of structure which will presently be fully described and pointed out in the claims, the present application being limited to the combination of the trencher, pipe making and laying appliances and cooperating driving mechanism, although the details of structure are fully illustrated and described to give a clear understanding of the apparatus.

Figure I is a side elevation of an apparatus constructed according to my invention. Fig. II is a plan view of same. Fig. III is a sectional view on the line III—III, Fig. I, showing a plan of the transmission parts and trencher. Fig. IV is a cross sectional view of the apparatus, on the line IV—IV, Fig. III. Fig. V is a similar view on the line V—V, Fig. I. Fig. VI is an enlarged detail view, in central vertical section, of the clutch on the main engine shaft. Fig. VII is a sectional view on the line VII—VII, Fig. III, illustrating the feeding mechanism leading from the material bins to the mixer. Fig. VIII is a sectional view on the line VIII—VIII, Fig. III, showing the transmission to the mixer. Fig. IX is an enlarged end view of the mixer hanger and transmission. Fig. X is a view of the hanger on the line X—X, Fig. XV. Fig. XI is a detail view of the water sprayer in the mixing chamber. Fig. XII is a longitudinal vertical section of the mixer and pipe former. Fig. XIII is a sectional view on the line XIII—XIII, Fig. XII. Fig. XIV is a sectional view on the line XIV—XIV, Fig. XII. Fig. XV is a plan view of the mixer hanging and power transmitting parts. Fig. XVI is an end view of the pipe laying parts.

Referring more in detail to the parts:— 1 designates a truck frame upon which the operative parts of my apparatus are mounted and which is provided with the forward steering wheels 2 and rear traction wheels 3. 4 designates an engine, of any suitable type, which is supported on truck 1, preferably over the rear driving axle 5.

6 designates the engine shaft which is driven through the ordinary crank 7 and piston rod 8.

Revolubly mounted in the sides of the truck frame is a main driving shaft 9, having a pulley 10 revolubly mounted thereon and connected with a pulley 11 on the engine shaft by a belt 12.

13 designates a clutch which is adapted for longitudinal sliding movement on shaft 9 to bring it into and out of mesh with a mating clutch 14, on the hub of pulley 10, but which is held from revoluble movement on the shaft by a feather 15.

16 designates a lever which is pivoted to the truck frame and has a yoke 17 projecting into a peripheral groove 18, in the clutch 13, and by which such clutch member is moved into and out of contact with its mating member, on the hub of pulley 10, to form a driving connection between the shaft 9 and the engine.

19 designates a pinion on shaft 9, which meshes with a gear 20 on the rear driving axle 5, whereby the rear running gear is actuated from the engine when the clutch just described is in its locked condition.

21 designates the trencher frame which is carried on the forward end of the apparatus and is provided with arms 22, having rollers axially mounted in their free ends and adapted for bearing against the inner surface of a bucket ring 23. In one of arms 22 is revolubly mounted a shaft 24, having rigidly mounted thereon a gear wheel 25 which is adapted to mesh with the rack 26 on the inner surface of the bucket ring and drive same when revolved.

27 designates a sprocket on shaft 24 which is operatively connected by a belt 28 with a sprocket 29 on the shaft 30, which is revolubly mounted in the forward end of the truck frame.

The ring 23 is preferably split to form a central slot, and the ring sections connected by the buckets 31 which are rigidly mounted on such sections and adapted for revolution therewith.

32 designates a flange which is supported from the trencher frame by a bracket 33 and is adapted to cover the ring slot, on the side upon which the buckets ascend, after they have performed their digging function, the bottom of each bucket being open, so that the dirt, which they have loosened and carried upwardly in their travel, may fall through the ring into a chute 34 which projects beneath the ring slot and is inclined downwardly to deliver at the side of the trench.

35 designates an intermediate shaft which is revolubly mounted in brackets 36 and 37, on the shafts 9 and 30, and is provided with the pinions 38 and 39 which are adapted respectively for meshing with the gear wheels 40 and 41 on the cross shafts, so that power may be transmitted to the shaft 30 from the main driving shaft, when the apparatus is in operation.

42 designates a shaft, the ends of which are fixed in the sides of the truck frame. Revolubly mounted on shaft 42 is a bracket 43, the arms of which are provided with horizontal bearings 44 which are adapted for supporting the arms 45 on the head 46 of the mixing and pipe forming cylinder 47. The arms 45 and bearings 44 are perforated to receive the pivot pin 48 by which the cylinder is axially mounted on its bracket. Cylinder 47 is channeled throughout its length and provided near its head with a mixing chamber 49, having an upwardly opening mouth 50 through which the pipe forming material is received into the chamber.

51 and 52 designate tanks which are supported on the truck frame and have the downwardly opening mouths 53—54, which form communication between the tanks and the feeding conduits 55 and 56, which latter are adapted for delivering material into the mixing chamber and cylinder 47 through the elbows 57 and 58. Tanks 51 and 52 are preferably of a hopper formation, in order that they may automatically feed toward the delivery conduits, and are supported at their forward ends by the posts 59.

Extending longitudinally through the conduits 55 and 56 and revolubly mounted in bearings therein is a shaft 60, and rigidly mounted on said shaft, within the conduits, are the worms 61 and 62 which are adapted to feed in the direction of the conduit elbows, when the shaft is revolved.

Fixed to shaft 60, preferably intermediate the elbows 57 and 58 is a beveled gear 63 which meshes with a similar gear 64 on a short shaft 65 revolubly mounted in bearings in one of the feeder conduits, and in a bracket 66 suspended from the truck frame. Rigidly mounted on shaft 65, is a gear 67 which meshes with a gear 68, on a shaft 69, which is revolubly mounted in a bracket 70 on the main driving shaft and in the brackets 71 which are suspended from the truck frame.

72 designates a gear on shaft 69 which meshes with a gear 73 on the main driving shaft, so that the shaft 69 is revoluble upon the revolution of the main shaft and the feeding worms actuated upon the revolution of shaft 69.

76 designates a shaft which is also revolubly mounted in brackets 71 and extends backwardly toward the cylinder 47, being provided with the knuckle joints 77 to enable the shaft to follow the cylinder when it moves on its pivotal mounting. Shaft 76 is revolubly mounted at the end opposite bracket 71, in a bearing 78 on the forward end of cylinder 47, and has rigidly mounted thereon a gear 79 which meshes with the gear 80 on the forward free end of the shaft 81 which projects through the cylinder channel and is revolubly mounted in bearings in the cylinder ends.

Fixed to shaft 81, within the mixing chamber, are the blades 82 which are adapted to thoroughly mix the material delivered to the chamber through the worm conduits previously mentioned.

83 designates a screw which is rigidly fixed on shaft 81 and is adapted for conveying the mixed material from the chamber 49 to the mouth of a pipe forming mold, which will presently be described, the screw channel being tapered from the mixing chamber to the mold mouth, and the screw tapered to fit snugly within the channel throughout its length. At its delivery end, the screw channel is curved downwardly and provided with a mouth through which the forward end of a mold 84 is projected and within which such forward end is rigidly secured. The mold 84 is preferably formed in sections, the mouth piece 85 of which is composed of metal and rigidly fixed in the cylinder mouth and provided with the ribs 86 which project slightly into the cylinder channel, the ribs being narrow to provide the greatest possible feeding space therebetween. The outer end of the mouth piece 85 is threaded and carries a collar 87 to which a resilient mold body 88 is secured; such body being preferably composed of a strong rubber composition that may bend downwardly in order to rest on the bottom of a trench without bulging under the pipe forming pressure. At its outer end the resilient body 88 is provided with a metallic extension 89, over which a tube 90 is adapted to fit; such tube being provided with a latch 91 by which it is anchored to a bracket 92 on the metallic extension 89. Tube 90 is of greater diameter than the mold body or extension to facilitate the delivery of the pipe, while guiding same to a proper position in the trench, and is preferably split longitudinally to provide greater freedom to the pipe during its exit. 93 designates a weight which is preferably carried by the tube 90 for holding the tube and pipe mold to the bed of the trench.

Fixed to the arms 86 on the mold mouth piece 85 is a mandrel 94 and threaded into said mandrel is the head 95 of a core rod 96, which extends back through the center of the mold and projects from the free end of the tube 90. The rod 96 carries a resilient core 97 around which the pipe body is formed.

98 designates a hanger which is pivotally connected with the rear end of cylinder 85 and extends upwardly through an aperture in the back of the truck frame.

99 designates a hand wheel which is threaded onto the upper end of hanger 98 and is adapted to bear against the top of the truck frame in order to support the rear end of the cylinder and afford an adjustable mounting therefor.

100 designates a water tank which is supported on the forward end of the truck frame and has a conduit 101 leading back to the mixing chamber where it terminates in a nozzle 102, the conduit 101 being provided with a valve 103 by which the flow of water from the tank to the mixing chamber may be regulated.

Assuming the parts to be assembled, as described, and ready for operation, power is applied to the main driving shaft and simultaneously transmitted therefrom to the rear running gear, the trencher, the mixer blade and screw shaft and to the worms in the feeding conduits, leading from the supply tanks to the mixing chamber. Upon the operation of the parts, just mentioned, the trencher will cut a trench in advance of the pipe forming parts, and convey the dirt over and deliver same to the chute 34, through which it is conducted to the side of the machine's path, and dumped out of the way of the apparatus. As the machine travels forwardly the material from the supply tanks is moved inwardly toward the cylinder, by the worms 61 and 62, which, as well as the conduits containing them, are of proper size, relative to each other, to feed proper amounts of cement and sand, of which the pipe forming combination is usually formed, into the mixing chamber. Simultaneously with the delivery of the dry pipe forming elements, the proper amount of water for the mixture is delivered into the chamber through the nozzle 102 and all of the elements thoroughly agitated and mixed by the blades 82. After being mixed, the material is taken up by the worm 83 and conveyed back through the tapering channel to the mouth of the mold, through which it is forced with sufficient pressure to form it into a compact ring, between the resilient core and the mold body 85, a continued feeding from the cylinder forcing the ring back through the mold and out of the tube 90 into the bed of the trench.

The truck propelling, trenching and mixing parts may be so regulated that the trench is dug and the pipe formed and delivered in a manner to form a continuous pipe, the delivery of the pipe at varying elevation being made possible by the resiliency of the mold body.

Having thus described my invention, what I claim as new therein and desire to secure by Letters Patent is:—

1. The combination with a motor driven truck, of a trenching device carried by said truck and adapted for actuation from the truck motor, a mixing device and feeder, both adapted for actuation from the truck motor, and a mold adapted for receiving material from the feeder and depositing formed pipe in a conduit provided by said trencher.

2. The combination with a truck, of a main driving shaft and a motor for actuating same, running gear operatively connected with said driving shaft, a trencher operatively connected with said driving shaft, a cylinder, mixing and feeding devices contained within said cylinder and operatively connected with said driving shaft, means for feeding material to the mixing device, and a mold adapted for receiving material from the feeder and for depositing formed pipe in a conduit formed by said trencher.

In testimony whereof I affix my signature in presence of two witnesses.

JOHN L. WIGGINS.

Witnesses:
  MYRTLE M. JACKSON,
  E. A. CAHILL.